Nov. 24, 1970 J. A. DE HUFF 3,542,998

CORED ELECTRODE FOR WELDING IN AIR

Filed June 7, 1967 4 Sheets-Sheet 1

INVENTOR
JOHN A. DE HUFF
BY
*Jerry R. Lassett*
ATTORNEY

INVENTOR
JOHN A. DE HUFF
BY
*Larry R. Cassett*
ATTORNEY

FIG. 7
COPPER CHILL DATA AT 2" STICKOUT

FIG. 8
COPPER CHILL DATA AT 3" STICKOUT

United States Patent Office 3,542,998
Patented Nov. 24, 1970

3,542,998
CORED ELECTRODE FOR WELDING IN AIR
John A. De Huff, Murray Hill, N.J., assignor to Air Reduction Company, Incorporated, New York, N.Y., a corporation of New York
Filed June 7, 1967, Ser. No. 644,215
Int. Cl. B23k 35/22
U.S. Cl. 219—146    13 Claims

ABSTRACT OF THE DISCLOSURE

A continuous cored electrode, and method of use thereof, for electric arc welding in an air atmosphere. The electrode is constructed of a metallic sheath with the center portion filled with granular materials including slag forming ingredients which melt during the welding operation while inside the solid electrode and then flow to the exterior of the electrode to form a film over the hot electrode to act as a physical liquid shield against the surrounding atmosphere.

---

The present invention relates to an electric arc welding process and to a composite welding electrode for use in said process.

The invention, more specifically, is useful in electric arc welding of steel in air using a continuous bare electrode and will be described with particular reference to such a use, although it is broader in many aspects as will be understood from the following descriptions.

In the field of electric arc welding as in any other field, there has been a constant endeavor to increase the quality of weld while reducing the cost and complexity of the operation. One proposed method of obtaining these goals is the development of a process whereby one could weld continuously in an air atmosphere (without an external protective shielding medium) and still obtain high quality welds.

While welding in air per se is not new, there is no method on the market for continuously welding in air which is completely acceptable from both weld metal property and cost points of view. Due to this fact, a large percentage of electric arc welding today is done with the use of a method which excludes the air from the region of the welding arc.

One such method is the submerged arc welding process. This process involves the use of a loose granular flux material that is laid in a pile over the area to be welded. The tip of the welding electrode is then buried in this flux material during the welding process and is thereby shielded from the air. The arc region and the hot metal of the weld is then shielded by molten slag formed from the melted flux material which floats on top of the molten steel and solidifies into a crust which is later removed.

This is a successful welding process and is widely used, but it has certain drawbacks which have made it unacceptable for many applications. It is costly and time-consuming to have to lay the flux material along the portion to be welded prior to the actual welding operation, and the excess flux must be collected after completing the weld. While equipment has been devised to do this automatically, it is expensive and its application to other than flat welding is limited. Also, the arc is not visible during the welding operation, which makes it more difficult to satisfactorily control the arc characteristics and to keep the arc positioned directly over the desired location. There are also other disadvantages, but those above are sufficient to show that submerged arc welding has short-comings.

A second method of excluding air is gas (artificial atmosphere) shielded arc welding. This process is somewhat similar to submerged arc welding as described above, but, instead of having the welding electrode submerged in flux, the electrode tip (and welding arc area) is enveloped with a gaseous atmosphere which is supplied to the arc area so as to exclude as much air as possible. Gases, such as argon, helium, carbon dioxide, and mixtures thereof, are commonly used for this purpose. However, this process also has serious limitations.

The equipment to facilitate the storing of the gas and carrying it to the point of being discharged so as to envelop the welding area to create the shielding atmosphere is complex and bulky. This equipment is costly and the operator is limited by its cumbersomeness. The use of such equipment is also limited to areas where there are no significant drafts which could lessen the effectiveness of the gas shield.

Perhaps the most common method of avoiding the effects of air is by the use of coated stick electrodes. A coated stick electrode is made up of a relatively short rod of metal (usually 12 to 18 inches in length) coated with a thick layer of flux material. The main disadvantage of the stick electrode welding process is that it is not continuous, and the operator is continually interrupting the welding operation to get a new electrode. It is also an inefficient process in that for every electrode used a short end portion is unusable and must be discarded.

There has been a continuing effort in welding research to develop a new welding process which would enable welders using a continuous wire having a bare surface to weld in the air in a continuous fashion as with gas shielded arc welding and submerged arc welding, but without the need of the large amount of special equipment required to practice those methods. One solution which is being worked on is the development of an air wire. "Air wire," as it is used herein, means a continuous wire electrode capable of picking up current from an electrical contact element and which will permit the deposition of high quality weld metal in an air atmosphere.

To be a completely acceptable product for welding, an air wire has to be able to shield the welding process from the air or to counteract effects of the air while not adversely affecting the mechanical properties of the weld. The two components of the air which must be dealt with are oxygen and nitrogen. All the other gases (or vapors) present in the air, as we most commonly encounter it, are either inert or present in such small amounts that they may be regarded as negligible.

Oxygen is no longer considered a serious problem as there are well-known deoxidizers that can be added to the electrode to negate the effects of oxygen. Oxygen can be a cause of weld porosity, but the deoxidizer prevents the porosity by reacting preferentially with the oxygen to form compounds which are either solid or liquid at the temperature of molten iron. This limits the oxygen which is available to react with the carbon present in the iron and thereby curtails the formation of gaseous carbon monoxide and carbon dioxide which cause the porosity when trapped in the weld as the steel solidifies.

Many materials perform the deoxidizing function but the most commonly used are manganese and silicon, as their presence is also desirable as alloying agents for enhancing the strength characteristics of the weld. These materials are widely used as deoxidizers in all types of welding processes where oxygen is present, whether it be from the air or from a gas shielding such as carbon dioxide or an argon-oxygen mixture. The effectiveness of deoxidizers has been demonstrated by depositing good quality weld metal in a 100% gaseous oxygen atmosphere.

Eliminating the effects of nitrogen is a more formidable problem. Nitrogen causes weld porosity as it exsolutes from the cooling molten steel forming bubbles which are trapped in the weld, or the nitrogen may dissolve in the molten steel as it solidifies and precipitates in the form of acicular iron nitrides (especially upon reheating during multiple-pass welding) to embrittle the weld metal. There are also materials (known for the present purposes as denitrifiers) which act in much the same manner as the deoxidizers in that these materials react with the available nitrogen to form compounds which are solids or liquids at the temperatures of molten iron. However, there are no common denitrifiers which do not in themselves have adverse effects on the mechanical properties of the weld metal or form compounds in the weld which have such effects when present in the quantities necessary to counteract the nitrogen.

Air wires have been produced which rely almost entirely on the action of these denitrifiers, and welds made with such wires are satisfactory for some applications. These electrodes have primarily been of the cored electrode type which are constructed of a hollow metal sheath with a flux material filling the center portion. It is in this center portion that such materials as deoxidizers and denitrifiers are put along with other materials such as slag formers for forming a protective surface layer on the trailing weld, arc stabilizers, and other materials which serve various well-known welding functions.

The denitrifier materials which have been used most commonly are aluminum, titanium and zirconium. As with deoxidizers, other materials are available which will serve as denitrifiers, but in practice the aluminum, titanium and zirconium have been selected due to their relatively low cost and performance.

Although air wires containing these denitrifiers can be used in certain applications, they are not acceptable where high quality welds are required as their presence in the concentrations necessary for effective denitrifying action cause brittleness in the weld. The effect, although undersirable, is not as objectionable in some applications, such as single pass welding wherein the base metal greatly dilutes the electrode metal. However, in multipass welding this dilution by the base metal is greatly reduced on the passes subsequent to the first few and the presence of these denitrifiers becomes objectionable. As stated above, multiple-pass welding can also result in the precipitation of embrittling nitrides.

Some air wires which contain significant amounts of denitrifiers are presently commercially available and have been used to make welds of relatively good quality, but only at the sacrifice of performance characteristics very much desired by welders. To obtain the higher quality welds the operator must weld with negative or zero length welding arcs. This means that the tip of the welding electrode must be kept at or below the solid surface of the workpiece in the crater of molten metal formed during the welding operation. This practice reduces the exposure of the hot electrode tip to the air as it is to some extent shielded in the arc generated vapors, and as is described below, reduces the time the molten metal is exposed to the nitrogen in the air in the arc gap. Therefore, the reduced nitrogen absorption obtained using this mode of operation permits a reduced content of denitrifier in the electrode.

However, to insure quality welds the operator must maintain the arc buried in the weld crater out of his view. This limits the operator's effectiveness and in applications where weld contour is important it is a serious problem due to the high, humped bead shape when using a buried arc. This type of welding also gives the operator very little margin of error if he is using a power supply with a drooping characteristic.

It is therefore an object of this invention to provide a method of welding in air using a continuous electrode.

It is a further object to provide a method of continuous welding in air whereby high quality welds may be obtained.

It is a further object of this invention to provide a continuous composite electrode capable of use in electric arc welding in air without the use of objectionable amounts of denitrifying ingredients.

It is a further object of this invention to provide a method of continuous electric arc welding in an air atmosphere whereby high quality, non-porous welds may be made without the need for including objectionable quantities of denitrifying ingredients or imposing limitations on the operator to use buried arc techniques.

It is a further object of this invention to provide a method of obtaining quality welds using a continuous welding process in an air atmosphere while providing the operator a greater margin for error than is presently available.

Further objects and advantages of this invention will be apparent from a study of the following specification and drawings of which.

Although the following descriptions of the present invention and the shielding mechanism used therein will be directed primarily at the problem of keeping the nitrogen content below a level sufficient to cause objectionable porosity, it will be understood that the invention could also be used in shielding the metal of the electrode and weld against other constituents of the arc environment.

The present invention contemplates the use of a liquid slag shield to protect the hot metal of the electrode and the weld from the nitrogen in the atmosphere. This shield is in the form of a film of slag which is formed over the electrode before the metal sheath begins to melt and is maintained as the electrode metal melts and forms into small molten droplets which traverse the arc gap to the weld pool. The film is maintained over the finished weld as a slag cover as is common with many conventional welding methods including the submerged arc process.

Some stick electrodes use this type of shielding, but as the flux material is already on the outside of the electrode obtaining such a protective film is no problem. To obtain this type of shielding when using a cored electrode, the flux which is initially on the inside of the metal sheath must be melted and brought to the outside of the electrode during the welding operation. The melting point of the film forming materials and the viscosity of the fluid formed by the melting thereof must be such that the film can form over substantially all of the electrode tip (Section C of FIG. 2) and a portion of the electrode behind the tip (Section B of FIG. 2).

An examination of some of the available cored electrodes presently used both in air and in shielding atmospheres disclosed that if the welding operation is halted a certain amount of slag can be seen on the exterior of the electrode tip but in no case was there a slag cover over any major portion of the tip such that any effective shielding could have been obtained. The slag cover that was observed was due to the fact that slag materials are present in the core and they are melted and transferred across the arc gap. If the welding operation is halted, some of the melted slag which is lighter than the molten metal floats to the surface, spreads out and may be in evidence on the surface of the tip. Very little, if any shielding will be evident on any portion of the electrode behind the tip (Section A of FIG. 2) and even the tip will not be fully protected.

Figure 1:
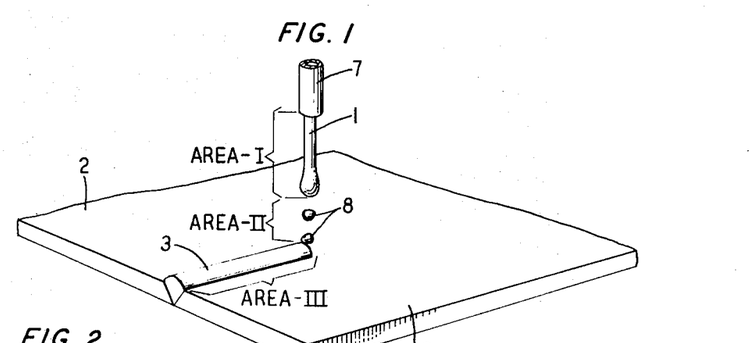
FIG. 1 is an illustration of a weld being made using a continuous electrode in an electric arc welding process with the main areas of nitrogen pick up being labeled.

To understand the operation of the present invention it is necessary to known how and where nitrogen gets into the weld metal. FIG. 1 illustrates a conventional welding operation wherein a continuous electrode 1 is fed toward a welding arc through a contact tube 7. The arc is maintained between the electrode and the workpieces 2. The weld 3 is formed by the solidifying of the metal as the arc is moved along the seam.

The other equipment necessary to the welding operation such as power supply, control system, and other pieces are not illustrated as they are all well-known.

FIG. 1 illustrates the three main areas in which nitrogen enters the metal forming the weld. Area I is the portion of the electrode between the contact tube 7 and the arc; Area II is the arc gap through which the electrode metal passes to reach the weld pool; and Area III is the weld pool and trailing weld.

Neglecting the original nitrogen content of the electrode and base metal, the nitrogen content of the finished weld results from the nitrogen absorption in these three areas.

A series of tests were performed to investigate the nitrogen pick up in each of Areas I, II and III.

Figures 2, 3, 4C, 4D:
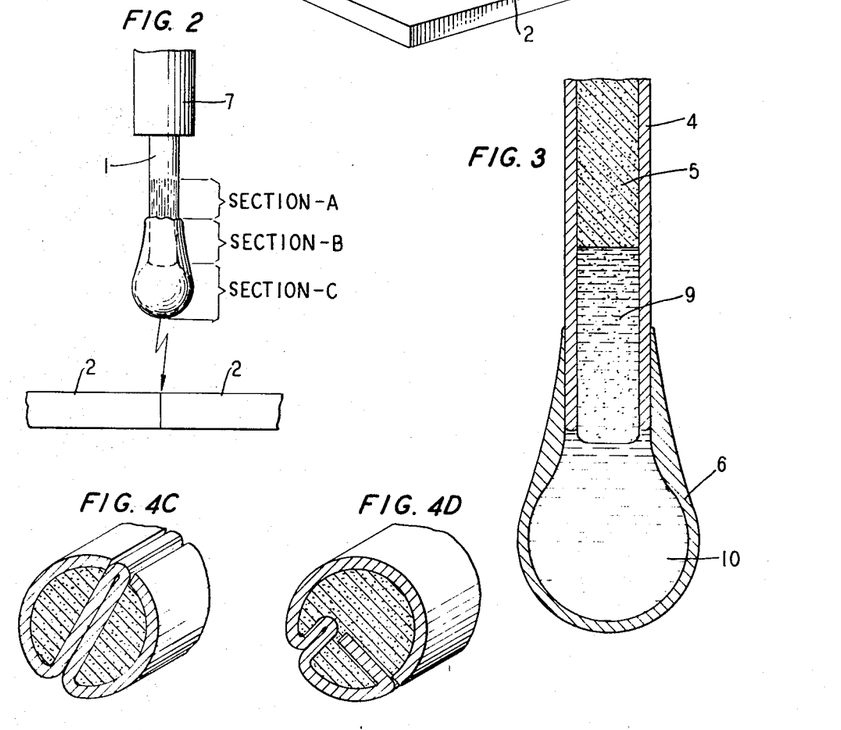
FIG. 2 is an illustration of how the electrode stickout portion of an electrode constructed according to the present invention would appear during the welding operation.
FIG. 3 is a cutaway illustration of an electrode tip of an electrode according to the present invention as it would appear during the welding operation.
FIGS. 4A–4F illustrates several different cross-sections of cored electrodes.
Figure 4A:
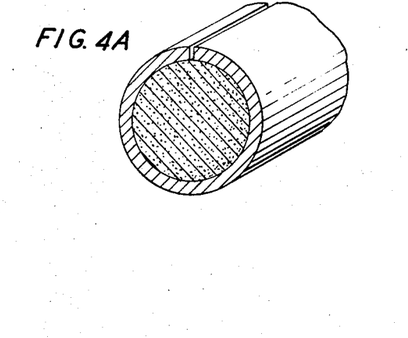
Figure 4B:
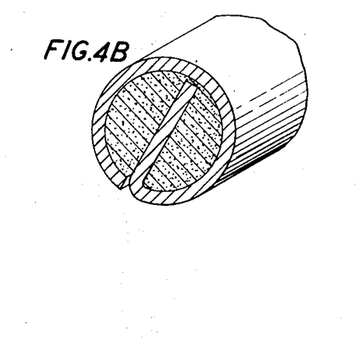
Figure 4E:
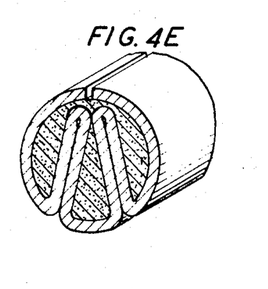
Figure 4F:
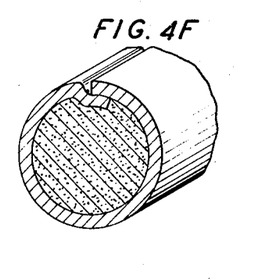

Area I was investigated by testing an electrode (not constructed in accordance with the preferred embodiment of the invention) having a sheath configuration as illustrated in FIG. 4a. The core contained 30% by weight a eutectic mixture of NaF and MgF$_2$ with the remainder of the fill being deoxidizers and iron powder. A welding operation using a ¾" stickout was interrupted on several occasions, and the electrode portion making up Sections A, B and C, as illustrated in FIG. 2, was cut and then divided into the three sections. Section A is the temper colored portion of the electrode above the slag cover; Section B is the portion above the tip not temper colored; and Section C is the solidified tip.

The result of this test (subject to the accuracy of the Kjeldahl method) shows that the nitrogen content of Section A was .009%, of Section B was .011%, and of Section C was .023%. It is a reasonably accurate assumption to say that the .009% of Section A is almost entirely made up of nitrogen contained in the electrode prior to the welding operation. If this is so, we see that the nitrogen pickup has the pattern of essentially zero pickup in Section A, a very slight pickup in Section B, and a large (.012%) pickup in Section C. These test results illustrate first, that the nitrogen absorption in this area is significant as a total of .014% was absorbed even with some slag protection, and secondly, that in Area I (FIG. 1) the major point of nitrogen pickup is the tip of the electrode. A small amount of nitrogen is picked up in other parts of the electrode but the amounts are minor when compared to that absorbed by the tip.

A copper-chill test was used to investigate the nitrogen pickup in Area II where the metal droplets 8 traverse the arc gap to the weld pool. A copper-chill test is one in which a weld bead is laid down on a water-cooled copper plate. The desired result is to cool the metal droplets as quickly as possible so that the amount of nitrogen picked up subsequent to the trip across the arc gap will be minimized.

Figure 5:
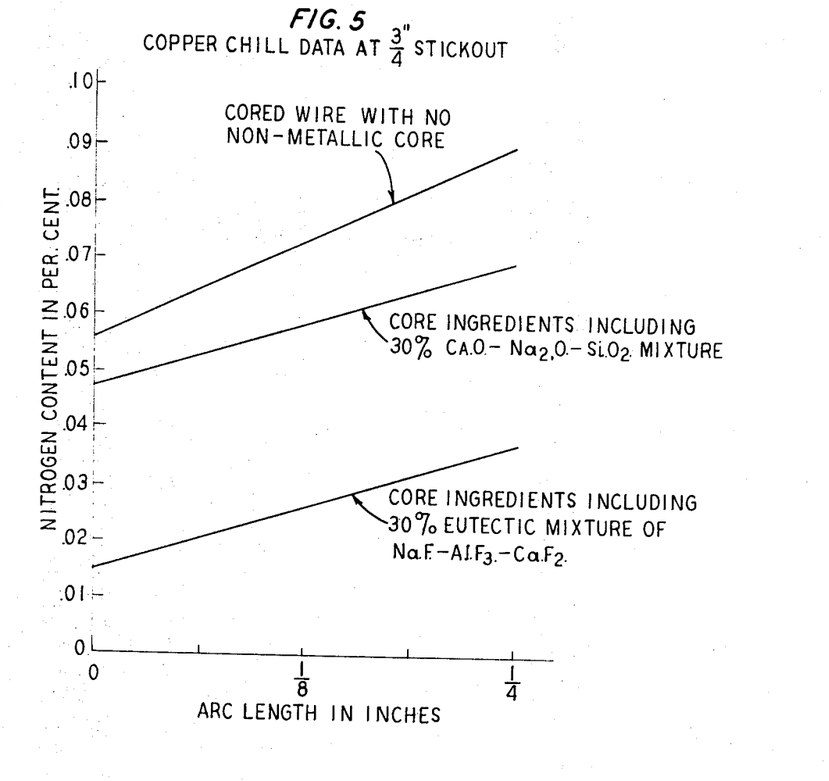
FIGS. 5–9 illustrate test results obtained investigating the operation of the present invention.

This experiment was performed using a ¾" stickout at arc lengths of 0, ⅛, and ¼ inch with a cored electrode having a FIG. 4a type structure. The cored material was comprised of iron powder, deoxidizers, and 30% by weight of a low melting temperature (750° C.) prefused mixture of glasses (CaO; Na$_2$O; SiO$_2$). The results of the analysis of the nitrogen content of the metal on the copper plate are shown in FIG. 5.

The test results show that (assuming nitrogen content at zero arc length to be that picked up only by the tip) there is a substantially linear relationship between the arc length and the pickup of nitrogen. This is thought to be because the time the droplets are exposed to the atmosphere is also increased substantially linearly as the arc length is increased.

It is noted that the .047% nitrogen picked up in the tip is high, but this can be explained by the high viscosity of the glasses at the temperatures attained in FIG. 4a type sheath at the short ¾ inch stickout. Some shielding was obtained as can be seen by comparing these results with the figures obtained (also on FIG. 5) from another similar test using a cored electrode with no slag forming ingredients in the core.

A similar set of tests was performed with another FIG. 4a type electrode with a ternary eutectic of $$NaF—AlF_3—CaF_2$$

that melts at 680° C. substituted for the above mentioned glass mixture. The stickout was left at ¾ inch and the results are also shown on FIG. 5 for ease of comparison. It is noted that the shielding given the tip is substantially improved while the additional nitrogen pickup in the arc gap was the same for each electrode. This would be expected as the glass mixture slag is much more fluid in the arc heat and therefore able to provide some protection to the metal droplets. The main fault with the glass slag system at short stickouts and cylindrical sheath structures is that they do not melt soon enough in the stickout portion of the electrode to be able to flow to form an adequate film over the electrode tip.

It is evident from the just described tests that a significant portion of nitrogen can be picked up in Area II. That protection against nitrogen can be obtained in the arc gap by the use of a film of slag on the metal droplets has been demonstrated by the above tests, but as will be discussed below, the shielding should be more effective than that reported above which permitted approximately .025% nitrogen into the metal in the arc gap region at ¼ inch arc length.

The nitrogen absorption in Area III can be determined by measuring the nitrogen content of a weld and then subtracting the portion picked up in Areas I and II as previously determined by a copper-chill test. The nitrogen pickup in this area will, of course, vary but the use of slag covers over the weld are old and well-known and it has been demonstrated that the nitrogen pickup attributable to Area III can easily be limited to .005%. This figure may seem quite small but it must be remembered that in Areas I and II percent of electrode weight was discussed and in Area III it is the percent of weld material which is being considered. The weld material includes significant portions of base metal that have been melted into the weld.

From analyzing the above tests, it is apparent that the main areas of concern are the electrode tip (Section C of Area I) and the arc gap (Area II). While the other Sections of Area I and Area III do contribute to the total nitrogen content, they are minor in that their contribution is small or the problem has a known solution.

The percent of nitrogen content which can be tolerated in a weld cannot be positively stated to be any definite figure. This figure will vary depending on the particular application and the method of welding wherein such things as the cooling rate of the weld pool affect the behavior of the nitrogen in the weld pool and therefore its objectionable character. For the purposes of having a goal, the figure of .025% has been chosen as a maximum, as welds of this content or lower exhibit characteristics which are normally well within the limits prescribed by users. This should not be interpreted to in any way limit the invention to processes or electrodes for making welds of such a nitrogen content, but rather, as being selected to show the capabilities of the invention.

As it is also an object of this invention to give the operator (welder) some arc length, an additional goal has been given consideration in the development of this invention, this being the ability to weld at arc lengths up to as much as ¼ inch even though a ⅛ inch capability is normally sufficient. This not only gives the welder freedom of movement but also gives welds with much improved bead shapes and permits the operator to see the arc which is a desirable feature and necessary in many applications.

The manner of preventing nitrogen absorption is illustrated in FIG. 3. The electrode is constructed of a sheath material 4. Mild steel was used in all the electrodes described herein but for welding some metals, nickel, aluminum or some other metal may be more desirable. In the center portion of the electrode there is a granular material 5 which is shown as molten 9 for a certain distance behind the tip. The core material includes slag forming ingredients, deoxidizers, and powdered metallic filler. The slag formers are composed of high and low melting point materials or combinations thereof. As the electrode is fed toward the welding arc, the sheath metal melts and forms a molten ball of metal 10 at the tip of the electrode.

During the welding operation the current for the arc is conducted to the arc through the sheath 4. The $I^2R$ heating effect of this current in the stickout portion of the electrode in combination with the heat of the arc itself melt the low melting point core ingredients. The fluid 9 formed by these melted core ingredients then flows (primarily through the seam) to the outside of the sheath and spreads across the exterior of the electrode including the molten tip to form a film barrier 6 to shield the hot metal from the atmosphere. This barrier should, if the electrode is constructed according to the present invention, cover the tip as well as a portion of the solid electrode above the tip.

It is highly desirable that the film extend above the tip to (1) offer some shielding in this area, (2) to insure a good slag on the molten tip itself, and (3) to insure good coverage on the molten drops as they leave the electrode.

As the film forms over the tip itself, the higher melting point slag formers are also melted and add to the slag coverage. When the molten metal forming the tip separates from the electrode to travel across the arc gap (Area II) the slag cover goes along with it.

As the temperatures in the arc are extremely high, some of the slag materials are vaporized which tends to reduce the slag cover, but this can be overcome by including high vaporization point materials or increasing the percentage content of slag material in the core thereby providing for a thicker slag film which would, of course, take longer to boil away.

Providing sufficient amounts of slag ingredients insures that some will survive the high arc temperatures to provide the slag coverage on the weld (Area III). As stated above, the use of a slag cover over a trailing weld is well-known and obtaining it provides no serious problem.

The effectiveness of the protective film as it functions to shield the metal in Areas I and II is dependent primarily upon (1) the configuration of the sheath; (2) the welding conditions; and (3) the composition of the core ingredients.

FIG. 4 illustrates several different sheath configurations. It has been stated that for proper shielding it is important that the slag forming materials be melted some distance behind the electrode tip. A rapid transfer of the $I^2R$ heat from the electrode sheath to the slag forming materials is essential to proper melting action.

The configuration as shown in FIG. 4a is the common cylindrical type which was used in the preliminary tests described above. Comparing this configuration with those illustrated in FIGS. 4b, c, d, and e, it is apparent that the distance the heat must travel from the sheath to the inner core ingredients is considerably less in the latter configurations.

Another important sheath configuration consideration is the path via which the melted core ingredients will travel to reach the exterior of the electrode. The place-ment of the seam and its relationship to the rest of the sheath configuration is important in this regard. Preferred configurations for this purpose are types a, c, d, e, and f.

The exact configuration is not important and the invention is not limited to any particular configuration, but rather, covers the use of a sheath having an intrusion into the center portion of the core with the seam placed in such a manner as to be in close proximity to the slag forming materials in the core.

Other limitations on the sheath configurations are practical ones such as (1) cost of fabrication, (2) handling characteristics of finished electrode, and (3) the desirability of a high ratio of depositable metal weight to total electrode weight.

The third of the just listed limitations is one reason why the core ingredients should contain no more non-metallics than necessary. As will be seen below, iron powder (or other filler metal in the case of an alloy welding electrode) is used to fill any core space not needed for slag ingredients and deoxidizers. The use of iron powder increases the deposition rate and also aids in forming the shielding mechanism as the iron powder makes for more efficient heat transfer within the core. In this way the iron powder functions much the same as the intrusion into the core although not as effectively as the intrusion.

Welding conditions which affect the effectiveness of shielding mechanism are current and stickout. The stickout of the electrode is that length of the electrode between the contact tube and the tip at which the arc is maintained. As the stickout length is increased, the heating of the flux material becomes less of a problem. The heat generated in the sheath is a function of the $I^2R$ heat due to the welding current and the residence time an electrode segment spends in this zone. As the stickout is increased the R of the $I^2R$ term and the residence time are both increased. The net effect is to increase the heat that is applied to the core ingredients as the stickout increases. It is not necessary that these ingredients attain the temperature of the sheath, but the increased heating effect of the longer stickout aids in insuring that the slag ingredients melt a sufficient distance behind the tip to enable them to flow to the outside of the electrode to form a protective film behind the tip as well as on the tip itself.

The third and perhaps most important factor affecting the performance of the shielding mechanism is the composition of the core ingredients that are to form the shielding film. These ingredients must melt and form a low viscosity fluid at the temperatures (approximately 1000° C.) attained inside the electrode in the stickout portion of the electrode (Area I of FIG. 1). They must resist vaporization in the arc (where temperatures exceed 2800° C.) in order that sufficient slag coverage over the weld is obtained, and they, of course, must be free of adverse effects on such things as the weld metal properties, arc stability and slag removal characteristics.

The materials from which the film forming ingredients could be selected include the refractory oxides, potassium salts, lithium salts, chlorides, iodides, bromides, fluorides and the glasses. These materials are all capable of forming a slag, but some of their individual characteristics limit the breadth of their application.

At temperatures in the range we are considering, many of the glasses have a high viscosity and their use would result in a poor protective film (as was described above in connection with the test results shown in FIG. 5). The above described tests were, of course, not made with an electrode having a sheath according to the preferred embodiment of the invention, and the tests results would have been much better had such an electrode been used, but the fact remains that the viscous nature of the glasses makes them less desirable than some other materials.

The salts and chlorides have very low melting points, but they tend to pick up moisture in storage and are therefore objectionable as hydrogen can be as harmful to the weld as nitrogen.

The oxides as a general rule have high melting temperatures. This does not make them completely objectionable as it is just this type of material which is useful to ensure that an adequate amount of slag material avoids vaporization in the arc to provide an adequate slag blanket over the weld. The oxides also could be used effectively in electrodes having exceptionally good heat transfer characteristics such as that illustrated in FIG. 4e or in applications where extremely long stickouts (in excess of 2 inches) can be used.

The bromides and iodides are believed to be acceptable from a performance point of view but at the present time they are considered dangerous due to the toxic gases given off during the welding operation. In the event this problem can be overcome these two groups of compounds provide a probable source of useful materials.

The fluorides then are the preferred materials as they are relatively inexpensive, are available in adequate quantities, have only minor adverse effects on the welding operation, and have relatively low melting points.

No one member of any of the above mentioned classes of materials appears to satisfy all of the requirements of the shielding mechanism of the present invention, but these requirements can be met by combinations of materials from the categories listed.

Figure 6:
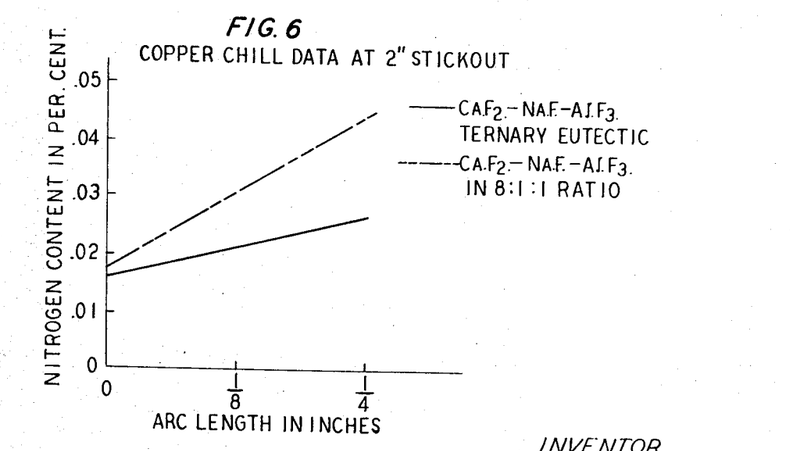

A mixture of fluorides which exhibits favorable properties is an eutectic of $CaF_2 \cdot NaF \cdot AlF_3$. The melting point of such an eutectic is about 680° C. and should resist vaporization below 2500° C. due to the presence of $CaF_2$. Mixtures near the eutectic were tried, and a copper-chill test was run with an electrode having as FIG. 4a type configuration and a core composition as listed in Table I. The results illustrated in FIG. 6 show much less nitrogen content than obtained in previous tests, but as this was a copper-chill test the .005% nitrogen absorption of Area III must be added. This would raise the total nitrogen content for a weld made at ¼ inch are length to above the .025% maximum established above.

TABLE I

Configuration—FIG. 4a
Electrode diameter—.110 inch
Percent fill—24%

Composition

| Core material: | Percent by weight |
|---|---|
| NaF | 12 |
| $AlF_3$ | 13 |
| $CaF_2$ | 5 |
| Fe.Mn (90%) | 10 |
| Fe.Si (75%) | 5 |
| Fe | 55 |

The arc was also somewhat erratic and slag removal characteristics were objectionable so the amounts of $AlF_3$ and NaF were reduced giving a mixture ratio of 8:1:1 of $CaF_2$—NaF—$AlF_3$ (see Table II). In subsequent tests it was seen that this improved the slag and arc stability problems but as the 8:1:1 mixture has a melting point of approximately 1200° C. the protection afforded the electrode tip was reduced. The rate of nitrogen pickup in the arc gap was also increased due to the failure of an adequate film to form on the tip. These results also are illustrated in FIG. 6. The reduced effectiveness of the shielding mechanism is shown by the increased nitrogen content at zero arc length (nitrogen absorption in the electrode tip) and the increase slope of the curve.

TABLE II

Configuration—FIG. 4a
Electrode diameter—.110 inch
Percent fill—24%

Composition

| Core material: | Percent by weight |
|---|---|
| $CaF_2$ | 24 |
| $AlF_3$ | 3 |
| NaF | 3 |
| Fe.Mn (90%) | 10 |
| Fe.Si (75%) | 5 |
| Fe | 55 |

To increase the shielding given by the 8:1:1 mixture of $CaF_2$, $NaF_3$ and $AlF_3$, this mixture was put in an electrode with a FIG. 4d type configuration. The 8:1:1 mixture was left at 30% of the core material weight but 20% of the iron power and deoxidizers were removed and 10% each of rutile and cryolite was added. See Table III. Rutile is basically $TiO_2$ which is an oxide and has higher melting and vaporization points and serves the function of improving the slag cover over the weld. The cryolite is a mixture of NaF and $AlF_3$ and is used to offset the effects of the rutile on the melting point of the slag ingredients.

TABLE III

Configuration—FIG. 4d
Electrode diameter—.110 inch
Percent fill—32%

Composition

| Core material: | Percent by weight |
|---|---|
| $CaF_2$ | 24 |
| $AlF_3$ | 3 |
| NaF | 3 |
| Rutile | 10 |
| Cryolite | 10 |
| Fe.Mn (90%) | 6 |
| Fe.Si (75%) | 4 |
| Fe | 40 |

Figure 7:
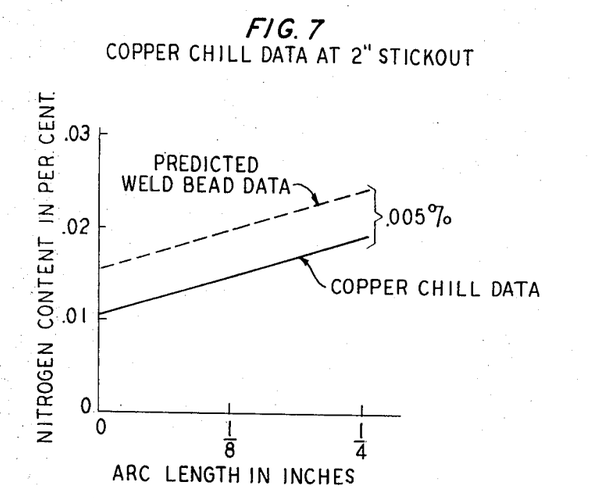

The copper-chill tests were repeated and the results are graphed in FIG. 7. Also on FIG. 7 there is an illustration of what the nitrogen content of a weld would be if a weld was being made rather than a copper-chill test. This latter curve shows that the nitrogen content of such a weld made with a ¼ inch arc length would be approximately .025 percent, which meets the standard of .025 percent set above. Actual welds made using such an electrode substantiated the just described test results and these welds were also found to be non-porous.

Figure 8:
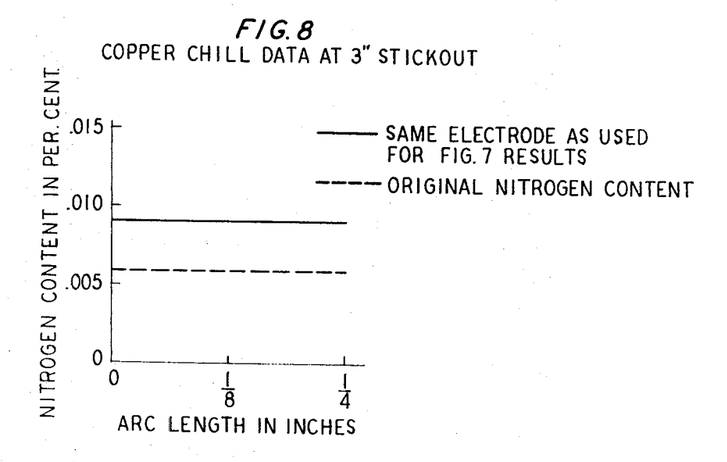

To further illustrate the capability of this invention the same electrode Table III as used in the just preceding test was used in a further copper-chill test only using a 3 inch stickout to get added heating to the core ingredients and thereby give the film forming ingredients a better chance to melt and perform their intended function. The results of this test graphed in FIG. 8 show that the nitrogen content is approximately .009 percent (or adding the .005% for pickup in the weld—.014%). An examination of this electrode showed that its original nitrogen content was approximately .006% so the pickup during the welding operation at a 3 inch stickout at ¼ inch arc length was on the order of .008 percent.

It was also determined that increasing the core content of nonmetallics to 80 percent (see Table IV) did not improve on the immediately preceding results. This would seem to indicate an adequate film throughout Area II at the lower level.

TABLE IV

Configuration—FIG. 4d
Electrode diameter—.110 inch
Percent fill—32%

Composition

| Core material: | Percent by weight |
|---|---|
| $CaF_2$ | 38.4 |
| NaF | 4.8 |
| $AlF_3$ | 4.8 |
| Rutile | 16 |
| Cryolite | 16 |
| Fe.Mn (90%) | 6.5 |
| Fe.Si (75%) | 4.3 |
| Fe | 9.2 |

Many different combinations of the above discussed materials will produce an electrode capable of functioning according to the method of this invention. The following are two additional examples of specific core composition used in electrodes which were used to weld in an air atmosphere without experiencing excess nitrogen absorption. In each case the sheath was mild steel and had a configuration as illustrated in FIG. 4(c). The fill was on the order of 30% by weight of the total electrode which had a diameter of approximately .110 inch.

EXAMPLE I

| Core material: | Percent by weight |
|---|---|
| $CaF_2$ | 6 |
| $AlF_3$ | 24 |
| NaF | 10 |
| Fe.Mn (90%) | 12 |
| Fe.Si (75%) | 8 |
| Fe | 40 |

EXAMPLE II

| | |
|---|---|
| $CaF_2$ | 20 |
| $AlF_3$ | 20 |
| Fe.Mn (90%) | 12 |
| Fe.Si (75%) | 8 |
| Fe | 40 |

Preferred compositions of core ingredients have resulted from a discovery of the unusual melting point characteristics of mixtures of zircon and certain fluorides. The fluorides have a low melting point and have been used in the invention to form a significant portion of the slag film on the electrode tip.

A problem is presented by the necessity for higher melting point materials to maintain the film in the arc gap and to form the trailing slag shield because adding these materials to the fluorides normally results in raising the effective melting point of the mixture to a point above that of the fluorides alone. Normally the more high-melting point ingredients that are added, the higher the melting point of the mixture. This tends to hinder the formation of the film at an early enough stage to protect the electrode metal before traversing the arc gap, which is a point of substantial nitrogen absorption.

However, zircon has a high melting point, but is only soluble in certain fluorides to a small extent at the melting temperatures of the fluorides, with greater solubility occurring at temperatures approaching the melting point of the zircon. Since such a high temperature is not reached in that portion of the wire where it is important for core ingredients to be molten, the zircon does not interfere with the melting point of the fluoride mixture or the flow and film-forming mechanism, i.e. it does not enter into combination with the fluorides until they have at least begun their electrode tip shielding function. The zircon content not in solution with the fluorides is merely carried along until the high temperatures of the arc and weldpool melt the zircon, and thus permit it to become a part of the trailing weld slag cover shielding mechanism.

The following are examples of the just described preferred embodiment using a mixture of zircon and fluorides as the main film-forming component of the core material. These compositions were placed in electrodes with FIG. 4c type sheaths and used to make welds if low nitrogen content. The percent fill again was on the order of 30% by weight and the electrode diameters are approximately .110 inch.

EXAMPLE III

| Core material: | Percent by weight |
|---|---|
| $CaF_2$ | 24 |
| $AlF_3$ | 3 |
| NaF | 3 |
| Fe.Mn (90%) | 12 |
| Fe.Si (75%) | 8 |
| Rutile | 5 |
| $ZrSiO_4$ | 10 |
| Fe | 35 |

EXAMPLE VI

| Core material: | Percent by weight |
|---|---|
| $CaF_2$ | 24 |
| $AlF_3$ | 6 |
| NaF | 6 |
| Fe.Mn (90%) | 12 |
| Fe.Si (75%) | 8 |
| Rutile | 5 |
| $ZrSiO_4$ | 10 |
| Fe | 29 |

EXAMPLE V

| Core material: | Percent by weight |
|---|---|
| $CaF_2$ | 14.5 |
| $AlF_3$ | 10.5 |
| Fe.Mn (90%) | 10.3 |
| Fe.Si (48%) | 8.7 |
| $ZrSiO_4$ | 18.1 |
| $MgCO_3$ | 4.7 |
| Fe | 33.2 |

EXAMPLE VI

| Core material: | Percent by weight |
|---|---|
| $CaF_2$ | 12.3 |
| $AlF_3$ | 8.2 |
| Fe.Mn (90%) | 6.9 |
| Fe.Si (48%) | 5.8 |
| $ZrSiO_4$ | 18.0 |
| $MgCO_3$ | 4.5 |
| Fe | 44.3 |

A series of test welds were made with an electrode having a core composition as listed in Table V. The test results listed immediately following Table V were obtained from tests performed on all weld metal. The impact results are the average results of the tests on two specimens.

TABLE V

Configuration—FIG. 4c
Percent fill—32%

Composition

| Core material: | Percent by weight |
|---|---|
| $CaF_2$ | 15 |
| $AlF_3$ | 11 |
| Fe.Mn (90%) | 5.9 |
| Fe.Si (48%) | 4.8 |
| Zircon | 19.5 |
| $MgCO_3$ | 5.3 |
| Fe | Bal. |

TEST RESULTS

| | Specimens | |
|---|---|---|
| Ultimate tensile strength (p.s.i.) | 83,000 | 79,800 |
| Yield strength (p.s.i.) | 63,000 | 66,000 |
| Charpy V-notch impacts (ft.-lbs.): | | |
| +70° | | 71 |
| +30° | | 58 |
| 0° | | 61 |
| −20° | | 42 |
| −40° | | 24 |

A second set of tests similar to those described immediately above were performed on four weld specimens made with an electrode having core ingredients as listed in Table VI. The results are listed just below Table VI.

TABLE VI

Configuration—FIG. 4c
Percent fill—32%

Composition

| Core material: | Percent by weight |
|---|---|
| $CaF_2$ | 12.2 |
| $AlF_3$ | 7.1 |
| Fe.Mn (90%) | 7.4 |
| Fe.Si (48%) | 6.2 |
| $ZrSiO_4$ | 19.5 |
| $MgCO_3$ | 5 |
| Fe | Bal. |

TEST RESULTS

| | No. 1 | No. 2 | No. 3 | No. 4 |
|---|---|---|---|---|
| Ultimate tensile (p.s.i.) | 95,800 | 97,100 | 95,200 | 98,200 |
| Yield strength (p.s.i.) | 72,800 | 73,900 | 71,000 | 73,200 |
| Charpy V-notch (ft.-lbs.): | | | | |
| +32° F | 40 | 45 | 45 | 49 |
| 0° F | 35 | 28 | 24 | 26 |
| −40° F | 20 | 16 | 17 | 18 |

The advantages of the present invention over the denitrifier type of air wire for making high quality welds havings good impact toughness can be seen from the following tests. Two substantially indentical electrodes were made, see Table VII, with the only difference being that one contained in the core 1% of $Mg_2Al_3$ in the place of 1% of the iron powder of the other. These electrodes were made using the same strip material for the sheath and were made as close together in time as possible on a single day.

Test welds were made with these electrodes under the same welding conditions in the same plate on the same day. Charpy V-notch specimens were removed and tested at the same time and the results listed immediately following Table VII show the greater toughness of the denitrifier free electrode.

TABLE VII

Configuration—Fig. 4c
Electrode diameter—.110 inch
Percent fill—32%

| | Percent by weight | |
|---|---|---|
| | a | b |
| Core material: | | |
| $CaF_2$ | 20.0 | 20.0 |
| $AlF_3$ | 10.0 | 10.0 |
| Fe.Mn (90%) | 5.5 | 5.5 |
| Fe.Si | 4.5 | 4.5 |
| $MgCO_3$ | 4.0 | 4.0 |
| Zircon | 15.0 | 15.0 |
| $Mg_2Al_3$ | 1.0 | 0 |
| Fe | 40.0 | 41.0 |

CHARPY V-NOTCH TEST RESULTS

| | Foot-pounds | |
|---|---|---|
| | a | b |
| Temperature, °F.: | | |
| +40 | 16, 13 | 71, 70 |
| 0 | 10, 8 | 57, 52 |
| −20 | 10, 7, 5 | 41, 31, 29 |

Figure 9:
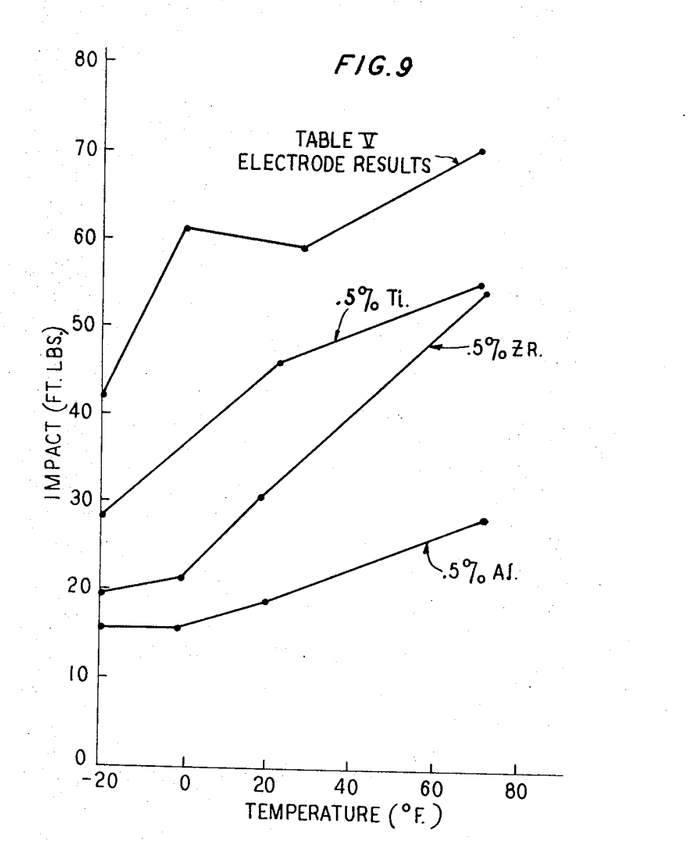

Further tests were run to give a good comparison between electrodes having titanium and zirconium (as well as aluminum) as denitrifying agents and electrodes embodying the present invention. Table VIII shows three electrode compositions quite similar to Table VII only having titanium, zirconium and aluminum in the place of $Mg_2Al_3$. It should be pointed out that the $Mg_2Al_3$ listed in Table VII is an alloy containing 60% aluminum. The results of impact toughness tests on Charpy V-notch specimens are illustrated in FIG. 9 and show that welds made with these electrodes have less toughness than the welds made with the Table VII (b) electrode.

TABLE VIII

Configuration—Fig. 4c
Electrode diameter—.110 inch
Percent fill—32%

| | Percent by weight | | |
|---|---|---|---|
| | a | b | c |
| Core material: | | | |
| $CaF_2$ | 20.0 | 20.0 | 20.0 |
| $AlF_3$ | 10.0 | 10.0 | 10.0 |
| Fe.Mn (90%) | 5.5 | 5.5 | 5.5 |
| Fe.Si (48%) | 4.5 | 4.5 | 4.5 |
| $MgCO_3$ | 4.0 | 4.0 | 4.0 |
| Zircon | 15.0 | 15.0 | 15.0 |
| Fe | 40.5 | 40.5 | 40.5 |
| Ti | 0 | 0.5 | 0 |
| Zr | 0.5 | 0 | 0 |
| Al | 0 | 0 | 0.5 |

The above described tests of the invention have shown that the invention is not limited to any single composition of core ingredient or sheath configuration. Table IX shows a broad range of materials which have been found to perform satisfactorily in an electrode having approximately 32% fill.

TABLE IX

| Core material: | Percent by weight |
|---|---|
| $CaF_2$ | 6–25 |
| $AlF_3$ | 3–25 |
| NaF | 0–10 |
| Fe.Mn (90%) | 5–15 |
| Fe.Si (48%) | 4–12 |
| $ZrSiO_4$ | 0–30 |
| Rutile | 0–10 |
| $MgCO_3$ | 0–5.3 |
| Fe | 0–55 |

Table IX does not cover all the possible combinations of materials which fall within this invention for the invention includes the method of shielding the continuous electrode arc welding operation from nitrogen through the use of a slag shield formed on the electrode tip and maintained throughout the welding operation.

The invention is also not limited to electrodes for use at ¼ inch arc lengths. This length was merely chosen for the purposes of illustration. There are numerous welding applications where a ⅛ inch arc length or less is sufficient. It is also necessary in many applications to use stickouts of less than 2 inches which will require the use of shorter arc lengths.

The sheath configuration is also a variable which has been discussed and emphasis should be made that whatever configuration is used the electrode must have the capability to conduct the heat generated in the sheath to the greatest portion of the core ingredients and an easy access route to the exterior of the electrode must be available to the molten core ingredients.

I claim:
1. A wire electrode for electric arc welding in an air atmosphere comprising
a metallic sheath having a seam therein and enclosing an electrode center portion,
core material including slag forming ingredients filling said center portion, said slag forming ingredients having an effective melting temperature substantially below the melting temperature of the sheath and including a substantial percentage of components with a vaporization temperature above the melting temperature of the sheath, the configuration of said sheath being such as to provide a substantially unobstructed path from said center portion through said seam to the exterior of the sheath through which core material, when molten, flows to coat the molten metal formed by the arc at the electrode tip.

2. An electrode according to claim 1 wherein metallic sheath has a protrusion into said center portion.

3. An electrode as recited in claim 2 wherein said protrusion forms a diameter of said electrode and divides the center portion into two substantially equal halves.

4. An electrode according to claim 2 wherein the effective melting temperature of said slag forming ingredients is below 1200° C.

5. An electrode according to claim 2 wherein said core material comprises

| | Percent |
|---|---|
| $CaF_2$ | 6–25 |
| $AlF_3$ | 3–25 |
| NaF | 0–10 |
| Mn | 3.6–13.5 |
| Si | 1.5–6 |
| $ZrSiO_4$ | 0–30 |
| Rutile | 0–10 |
| $MgCO_3$ | 0–6 | with the balance being essentially impurities and Fe.

6. An electrode according to claim 2 wherein said slag forming ingredients comprises a mixture of fluorides and high boiling point oxides with the content of fluorides comprised substantially one half or more of the mixture.

7. An electrode according to claim 2 wherein said electrode composition comprises

| | Percent |
|---|---|
| $CaF_2$ | 1.9–8 |
| $AlF_3$ | .95–8 |
| NaF | 0–3.2 |
| Mn | 1.2–4.3 |
| Si | .5–1.9 |
| $ZrSiO_4$ | 0–9.6 |
| Rutile | 0–3.2 |
| $MgCO_3$ | 0–2 | the balance being essentially Fe and impurities.

8. An electrode according to claim 1 wherein the slag forming ingredients comprise at least 12% of the total weight of the electrode.

9. An electrode according to claim 2 wherein the slag forming ingredients comprise at least 12% of the total weight of the electrode.

10. An electrode according to claim 6 wherein said high boiling point oxides comprise zircon.

11. The method of depositing metal from a seamed consumable cored electrode containing slag forming ingredients onto a workpiece wherein an electric arc is maintained between the electrode and the workpiece in an air atmosphere comprising the steps of heating the slag forming ingredients to a temperature above their melting point such that a substantial portion thereof form a liquid inside the electrode at a point significantly behind the electrode tip, flowing the liquid slag through the electrode seam to the exterior of the electrode, and forming a slag film on the molten tip of the electrode and on a portion therebehind of sufficient quantity to resist total varporization by the heat of the arc during the period when the slag is transported across the arc gap to the workpiece as a protective coating on the molten droplets of electrode metal.

12. The method according to claim 11 wherein the core ingredients are melted by the heat of the arc and the power dissipated in the electrode sheath as the arc current flows therethrough.

13. A method of electric arc welding with a seamed cored electrode containing slag forming ingredients in an air atmosphere which comprises the steps of maintaining an arc between said cored electrode and a workpiece by connecting said electrode and workpiece in a series circuit with a current source capable of sustaining an arc heating slag materials contained in the core of the electrode with the $I^2R$ losses in the electrode sheath to melt a significant portion thereof while inside the core, flowing the melted slag materials through the electrode seam to the exterior of the electrode and forming a film of sufficient thickness over the molten electrode tip such that the film will be maintained on the molten metal as it transfers to the workpiece and solidifies.

References Cited

UNITED STATES PATENTS

| 1,501,266 | 7/1924 | Brace | 219—146 |
| 3,193,661 | 7/1965 | Danhier | 219—146 |
| 3,418,145 | 12/1968 | Yenawine et al. | 148—24 |
| 2,909,650 | 10/1959 | Landis et al. | 219—146 |
| 2,909,778 | 10/1959 | Landis et al. | 219—146 |

JOSEPH V. TRUHE, Primary Examiner

L. A. ROUSE, Assistant Examiner

UNITED STATES PATENT OFFICE
CERTIFICATE OF CORRECTION

Patent No. 3,542,998　　　　　　　　Dated November 24, 1970

Inventor(s) John A. DeHuff

It is certified that error appears in the above-identified patent and that said Letters Patent are hereby corrected as shown below:

Column 9, line 33, "as"　　　should be　　　-a-
Column 9, line 39, "are"　　should be　　　-arc-
Column 11, line 36, under "EXAMPLE II" the headings Core Material:　and　　Percent by Weight were omitted from the patent.

Column 12, line 21, "EXAMPLE VI" should be -EXAMPLE IV-
Column 16, line 18, "varporization" should be -vaporization-

SIGNED AND
SEALED
MAR 9 1971

(SEAL)
Attest:

Edward M. Fletcher, Jr.
Attesting Officer

WILLIAM E. SCHUYLER, JR.
Commissioner of Patents